(12) United States Patent
Kiiskinen et al.

(10) Patent No.: US 8,664,504 B2
(45) Date of Patent: Mar. 4, 2014

(54) METADATA TYPE FOR MEDIA DATA FORMAT

(75) Inventors: Arto Kiiskinen, Espoo (FI); Petri Lehtovirta, Tampere (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 0 days.

(21) Appl. No.: 10/513,113

(22) PCT Filed: Apr. 30, 2002

(86) PCT No.: PCT/IB02/01440
§ 371 (c)(1),
(2), (4) Date: Jul. 15, 2005

(87) PCT Pub. No.: WO03/094148
PCT Pub. Date: Nov. 13, 2003

(65) Prior Publication Data
US 2006/0112808 A1    Jun. 1, 2006

(51) Int. Cl.
*G10H 1/38*    (2006.01)
(52) U.S. Cl.
USPC .......................................................... 84/612
(58) Field of Classification Search
USPC ................... 84/612, 465; 482/3, 8, 9
See application file for complete search history.

(56) References Cited

U.S. PATENT DOCUMENTS

| | | | | |
|---|---|---|---|---|
| 5,137,501 A | * | 8/1992 | Mertesdorf | 482/57 |
| 5,679,911 A | * | 10/1997 | Moriyama et al. | 84/601 |
| 6,066,792 A | | 5/2000 | Sone | 84/609 |
| 6,672,991 B2 | * | 1/2004 | O'Malley | 482/8 |
| 7,032,178 B1 | * | 4/2006 | McKnight et al. | 715/747 |
| 2002/0002899 A1 | | 1/2002 | Gjerdingen et al. | 84/667 |
| 2002/0146469 A1 | * | 10/2002 | Wiegand et al. | 424/725 |

FOREIGN PATENT DOCUMENTS

| | | |
|---|---|---|
| EP | 0626689 A2 | 11/1994 |
| EP | 1085443 | 3/2001 |
| JP | 08160975 A * | 6/1996 |
| KR | 2001-50381 | 7/1999 |

OTHER PUBLICATIONS id3lib ; http://web.archive.org/web/20001019083501/http://id3lib.sourceforge.net/ ; Author: Scott Haug ; Date: Oct. 19, 2000.*
ID3 Tag Version 2: Informal Standard ; http://www.id3.org/id3v2-00.bct ; Author: Martin Nilsson ; Date: Mar. 26, 1998.*
id3v2.3. M. Nilsson. Feb. 3, 1999.*
CeBIT 2002 Part 1—A/V Devices & More, "Hard Drive Based Audio Recorders", T. Steinbrecher, Mar. 18, 2002, http://www.anandtech.com/showdoc.html?i=1598&p=2, 3 pages.
CeBIT 2002 Part 1—A/V Devices & More, "Sony Enters the MP3 CD Player Market". T. Steinbrecher, Mar. 18, 2002, http://www.anandtech.com/printarticle.html?i=1598, 7 pages.
"ID3v2 Made Easy", http://www.id3.org/easy.html, Apr. 12, 2002, 2 pages.
"ID3 Tag Version 2.4.0—Native Frames", M. Nilsson, Nov. 1, 2000, http://www.id3.org/id3v2.4.0-frames.text, 28 pages.
Korean Office Action dated May 29, 2009 Application No. 10-2004-7017478.

* cited by examiner

*Primary Examiner* — Jeffrey Donels

(57) ABSTRACT

A media data format is described along with devices, methods, computer readable media and a propagating signal in relation to the media data format. The media data format comprises a music data portion defining a music track, and a metadata portion defining metadata associated with said music track. Said metadata comprises a tempo metadata type having a tempo class value indicating a tempo class of the music track.

23 Claims, 3 Drawing Sheets

METADATA TYPE FOR MEDIA DATA FORMAT

CROSS-REFERENCE TO RELATED APPLICATION

This is the U.S. National Stage of International Application Number PCT/IB02/01440 filed Apr. 30, 2002 and published in English on Nov. 13, 2003 under International Publication Number WO 03/094148 A1.

FIELD OF THE INVENTION

The present invention relates to the field of digital media. More particularly the invention relates to digital content metadata in digital media.

BACKGROUND OF THE INVENTION

Today there are a wide set of terminals which includes means for viewing digital media. Examples of such terminals are wireless terminals, PCs, Personal Digital Assistants (PDA), consoles, CD players, MP3 players etc. The digital media is typically stored locally in a local storage medium of the terminal, on a CD-ROM or downloaded to the terminal from a remote storage medium or any combination thereof. The amount of digital media files that are available for download to a terminal today is large and is increasing everyday and so is the download rate. Furthermore, it is foreseen that the available sizes of local storage mediums of handheld terminals in the future will allow for storage of a relatively large amount of digital media files in a single handheld terminal.

If the media file is to be downloaded to a terminal and played back, or played back directly from the local storage medium of a terminal, this is a rather straightforward procedure, for example using a media player such as Winamp, RealPlayer or a browser plugin. For instance, the audio file format MP3 includes the ID3v2 tagging system for identifying several different metadata types associated with an audio track comprised in an MP3 file. Examples of such metadata types are Title, Artist/Author, Album, Year, etc. A specific audio track is played back from the local storage medium of a terminal by searching for and selecting the audio track that has the title or artist, etc., of that audio track. To download a specific audio track from a remote site on the Internet, a proper URL is entered to the browser and the audio track is downloaded.

However, in the case where the desired digital media is not so specifically defined as the name of a specific digital media file or, in the MP3 case the actual title, artist, etc., prior art offers no solution to the problem of finding the desired media files amongst a large number of media files that are available for download or are stored in a local storage medium. This problem increases as the number of media files increases.

SUMMARY OF THE INVENTION

An object of the invention is to eliminate or at least alleviate the above-described problems of the prior art.

Thus, according to the invention devices, methods, a media data format, a propagating signal, and a computer readable medium are provided that enhance the managing, organizing, downloading and playing back of digital media.

The invention exploits the recognition that a tempo class of a music track comprised in digital media is a very useful parameter when managing, organizing, downloading and playing back digital media.

Thus, according to a first aspect of the invention, a device is provided comprising a reading means for reading a media data format comprising a music data portion defining a music track, and a metadata portion defining metadata associated with the music track. The reading means is adapted to read a tempo class value of a tempo metadata type comprised in said metadata portion. The tempo class value indicates a tempo class of the music track.

In the invention, the music data portion comprises data that are used in order to control a device for playback of a music track. Furthermore, the metadata portion comprises data that are not specifically used for the playback of the music track, but gives general information regarding the music track. Examples of metadata could be Title, Artist/Author, Album, Year, Genre, etc. Furthermore, in the invention, the tempo class value is the value of the tempo metadata type which is comprised in said metadata. Thus, according to the definition of metadata herein, the tempo class value of the meta data type is intended to be used as information regarding the playback tempo of the music track and not to control the playback tempo of the music track. It is to be noted that the term music track is to be interpreted as any type of audio track which can be allotted a tempo. Furthermore, the music track may be comprised in a media file or streamed media comprising also other types of media, such as video, animations, pictures etc. Furthermore, it should also be noted that the tempo class value might also be NULL indicating that no tempo class has been assigned to the music track.

It should be noted that even though metadata are not specifically used for controlling the playback of a music track, they may be used as a means for selecting a music track for playback. For example, a device may be set to play music tracks associated to metadata comprising a artist metadata type indicating a specific artist only.

The tempo of a music track is usually measured in beats per minute (BPM). In the invention the tempo class is a general impression of the basic beat of a music track. This impression generally coincides with the theoretical definition of tempo used in musical theory, where the tempo is the number of basic units of a bar per minute. For example, if the basic unit of a bar in a musical piece is a quarter note, the number of beats per minute of that musical piece is defined as the number of quarter notes per minute.

Since the reading means of the device according to the invention is adapted to read a tempo class value of a tempo metadata type comprised in said metadata portion, where the tempo class value indicates a tempo class of the music track, it is possible to manage, organize, download, and play back digital media based on such tempo class values. Thus, the possibilities to manage, organize, download and play back digital media is enhanced. This new metadata type proves to be very useful in various applications of selection of digital media comprising music tracks. The tempo class value provides a more or less objective value on which to base the managing, organizing, downloading and playing back of digital media.

The tempo class value is preferably one of a set of tempo class values each defining a playback tempo range. For example the tempo class values may be integer values from 1 to 10. Each integer value then defines a playback tempo range where 1 corresponds to the lowest tempo and 10 corresponds to the highest tempo.

By introducing a set of playback tempo ranges defined by the tempo class values, the selection criteria on tempo will become more straightforward. Furthermore, using a set of integer values as the tempo class values, where the lowest integer value corresponds to the lowest tempo, and the highest integer value corresponds the highest tempo, will make the selection criteria even more straightforward. Of course this is just an example and any other similar schemes for uniquely identifying the tempo class values, such as a set of characters, such as A, B, C, or free text values, such as slow, medium, fast, etc. are equally applicable.

According to an embodiment, the device further comprises a selection means. The selection means is adapted to select a music track on the basis of the tempo class value associated with the music track.

The selection means allows the device to select a music track on the basis of the tempo class of the music track. Thus, the download and/or playback of desired music tracks is enhanced since the tempo of the music track is an important parameter for selecting amongst different music tracks in several situations. By adding the selection means, media files comprising music tracks with a desired tempo class can be selected from a large set of media files without any knowledge of the name, artist, etc. of the music tracks.

The selection means may be operable to select one or more music tracks associated with a first set of tempo class values during a first period of time and to select one or more music tracks associated with a second set of tempo class values during a second period of time. The first set of tempo class values are preferably different from the second set of tempo class values. This functionality enhances the download and playback of desired music tracks in cases where music tracks with different tempos are desired during different time periods. The need for manual control by the user between the first and the second time period is eliminated.

Alternatively, the selection means is adapted to select a music track associated with a set of tempo class value in response to a current value of an external tempo signal. This functionality enhances the download and/or playback of desired music tracks in cases where music tracks associated with different tempo classes are desired at different times in an way that is determined by an external tempo signal. The external tempo signal is a measurement or an estimation of the tempo of an external factor. The external factor is typically an activity or some other media to which the music tracks should be played. For example, music tracks with a similar tempo to the external factor could be selected, i.e. a high tempo of the external factor would result in the selection of a high tempo music track. Alternatively, music tracks with an "opposite" tempo to the external factor could be selected, i.e. a high tempo of the external factor would result in the selection of a low tempo music track. This functionality also enhances the retrieval of desired music tracks in cases where the desired tempo class of the music tracks alters over time in a way that is determined by an external tempo signal. The need for manual control by the user is eliminated since suitable music tracks will be selected in accordance with the current value of the external tempo signal.

According to another embodiment, the device is provided with a writing means. The writing means is adapted to write a tempo class value associated with the music track to the media data format.

According to second aspect of the invention a device for writing to in a media data format is provided. The device comprises a writing means for writing to a media data format comprising a music data portion defining a music track, and a metadata portion defining metadata associated with said music track. Furthermore, the writing means is adapted to write a tempo class value of a tempo metadata type comprised in said metadata portion, said tempo class value indicating a tempo class of said music track.

The device according to the second aspect can be used to alter or add a tempo class value in a media data format. For example in the case where the tempo class type has a NULL value a proper tempo class value can be added using the device. Thus, the possibilities to manage, organize, download and play back digital media is enhanced.

According to a third aspect of the invention a method of reading a media data format comprising a music data part defining a music track, and a metadata part defining metadata associated with the music track, is provided. The method comprises the step of reading a tempo class value of a tempo metadata type comprised in said metadata part. The tempo class value indicates a tempo class of the music track.

Preferably the tempo class value is one of a set of tempo metadata type values each defining a playback tempo range. For example, the playback tempo class values may be integer values from 1 to 10. Each integer value then defines a tempo range where 1 corresponds to the lowest tempo and 10 corresponds to the highest tempo. Of course this is just an example and any other similar schemes for uniquely identifying the tempo class values, such as a set of characters, such as A, B, C, or free text values, such as slow, medium, fast, etc. are equally applicable.

According to an embodiment, the method further comprises the step of selecting a music track on basis of the tempo class value associated with the music track.

The step of selecting may comprise the steps of selecting one or more music tracks associated with a first set of tempo class values during a first period of time, and selecting one or more music tracks associated with a second set of tempo class values during a second period of time. Preferably, the first set of tempo class values is different from the second set of tempo class values.

Alternatively, the step of selecting comprises the steps of receiving a current value of an external tempo signal and selecting a music track associated with a tempo class value in response to the current value of the external tempo signal.

According to another embodiment, the method further comprises the step of writing to the media data format a tempo class value associated with the music track.

According to a fourth aspect of the invention a method of writing to a media data format is provided. The media data format comprises a music data portion defining a music track, and a metadata portion defining metadata associated with the music track. The method comprises the step of writing to the media data format a tempo class value of a tempo metadata type comprised in the metadata portion. The tempo class value indicates a tempo class of the music track.

According to a fifth aspect of the invention a media data format is provided. The media data format comprises a music data portion defining a music track, and a metadata portion defining metadata associated with the music track. The metadata portion comprises a tempo metadata type intended to have a tempo class value indicating a tempo class of the music track.

The tempo class value is preferably one of a set of tempo class values each defining a playback tempo range. For example the tempo class values may be integer values from 1 to 10. Each integer value then defines a playback tempo range where 1 corresponds to the lowest tempo and 10 corresponds to the highest tempo. Of course this is just an example and any other similar schemes for uniquely identifying the tempo class values, such as a set of characters, such as A, B, C, or free text values, such as slow, medium, fast, etc. are equally applicable.

Said music data are preferably intended for use in music track playback.

According to a sixth aspect of the invention a computer readable medium is provided having stored thereon media data in a media data format comprising a music data portion defining a music track, and a metadata portion defining metadata associated with the music track. The metadata portion comprises a tempo metadata type intended to have a tempo class value indicating a tempo class of the music track.

According to a seventh aspect of the invention a propagating signal is provided comprising media data in a media data format comprising a music data portion defining a music track, and a metadata portion defining metadata associated with the music track. The metadata portion comprises a tempo metadata type intended to have a tempo class value indicating a tempo class of the music track.

According to an eighth aspect of the invention a computer readable medium comprising computer executable instructions for performing the steps of the method of reading a media data format or the method of writing values of metadata in a media data format described above.

According to a ninth aspect of the invention, a device is provided comprising a reading means for reading a media data format comprising a music data portion defining a music track, and a metadata portion defining metadata associated with the music track. The device further comprises selection means for selecting a music track on basis of a metadata type value comprised in said metadata associated with said music track.

Hence, according to this aspect music tracks can be selected on basis of a metadata type value. For example music tracks from a certain era, of a certain genre, etc., can be selected.

BRIEF DESCRIPTION OF THE FIGURES

In the following, the present invention is illustrated by way of example and not limitation with reference to the accompanying drawings, in which.

DETAILED DESCRIPTION OF THE INVENTION

Figure 1:
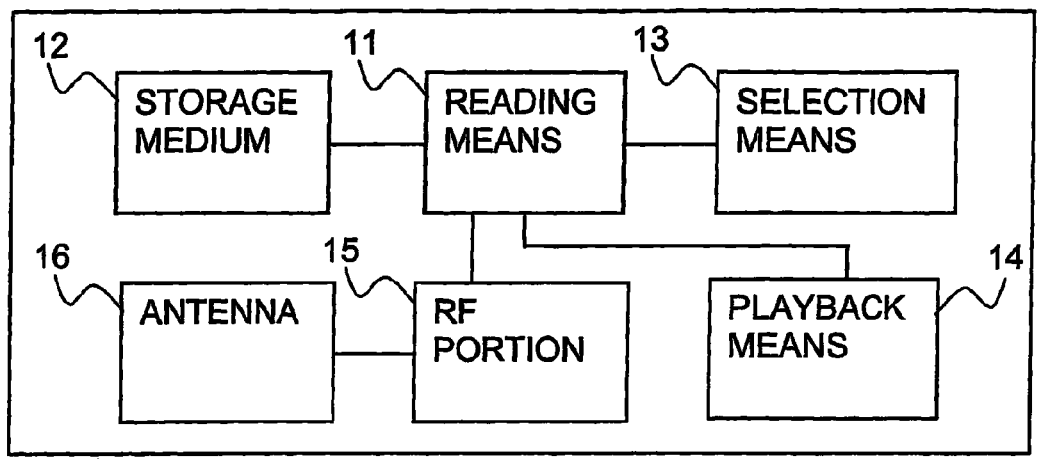
FIG. 1 is a schematic block diagram of an embodiment of a device according to the invention.

FIG. 1 is a schematic block diagram of an embodiment of a device 10 according to the invention. The device 10 includes functionality for storage and playback of MP3 music files. Examples of devices that may include such functionality are a PC, a CD (compact disc) player, an MD (mini disc) player, portable MP3 player, and a mobile communication terminal etc. The basics of MP3 are well known within the art and is not described further herein.

The device 10 in FIG. 1 comprises a reading means 11 functionally connected to a storage medium 12. Furthermore, a selection means 13 and a playback means 14 are functionally connected to the reading means 11. Furthermore the reading means 11 is functionally connected to an RF portion 15 and the RF portion is functionally connected to an antenna 16. The reading means 11 are adapted to read a media data format comprising music data defining a music track and metadata defining metadata associated with the music track. The media data format in this embodiment is the data format of MP3 files stored in the storage medium 12. The music data is the music data as defined in the MP3 standard and the metadata is the metadata as defined by the ID3v2 tagging system in MP3. The ID3v2 tagging system identifies several different metadata types associated with a music track comprised in an MP3 file. Examples of such metadata types are Title, Artist/Author, Album, Year, Genre, etc. Moreover, the MP3 files stored in the storage medium 12 of this embodiment each also include the novel metadata type referred to as tempo class.

The storage medium 12 is any suitable storage medium depending on the type of device. For example, in the case of a CD player the storage medium would typically be a CD, in the case of a mobile communication terminal the storage medium would typically be a RAM. More specifically, the reading means 11 is adapted to read a tempo class value of a tempo metadata type comprised in a novel metadata frame of the ID3v2 tagging system for MP3 files. In the device 10 the MP3 files are stored on the storage medium 12, and the tempo class value of each MP3 file on the storage medium 12 is one of the integer values 1-10 and indicates a tempo of said music track. The tempo class value 1 indicates a lowest tempo range, the tempo class values 2-9 each indicate a higher tempo range, and the tempo class value 10 indicates a highest tempo range. It should be noted that the number tempo ranges is for illustrational purposes only. The tempo is measured in beats per minute.

The playback means 14 are any well known means for playback of the music track defined by the music data in an MP3 file read by the reading means 11 from the storage medium 12.

The selection means 13 includes functionality to select MP3 files having different tempo class values during different periods of time. For example, the selection means 13 can be programmed to select MP3 files having different tempo class values during different periods of time. Such a programming can be used in order to make the device 10 automatically select music tracks suitable for different periods of times, such as different parts of a training session. For example, medium tempo music tracks are selected during a warm up period, high tempo music tracks are selected during an exercise period, and low tempo music tracks are selected during a stretching and relaxation period. The device 10 further comprises means (not shown) for storing a number of different programs. For example, this is applicable for exercise sessions like spinning, aerobics, circuit training etc.

The device will deliver a more enjoyable and more healthy training experience, and also improve the training results. For example, a very low tempo music during stretching will motivate for long enough stretching time.

Furthermore, the device 10 can be combined with downloadable training programs that can be stored in the mobile terminal and the training programs can be combined with the terminal calendar, creating a training calendar, adding the possibility of alerts for alerting the user that it is time for a training session and storage of a training log.

In an alternative, the selection means 13 can be controlled by an external tempo signal such that MP3 files having a certain tempo class value are selected by the selection means 13 in response to the current value of the external tempo signal. Such an external tempo signal could for example be a measurement or an estimation of the tempo of an external factor, such as a heart rate signal or a video or computer game tempo signal. In the case of using a heart rate signal the MP3 files selected for playback is adapted in accordance with the measured heart rate such that the listener adapts his or her behaviour in a way that results in a desired heart rate. I.e., if the heart rate is higher than the desired level MP3 files with a lower tempo class value are selected and vice versa. This is applicable for example for exercise where a listener adapts the exercise tempo to the music, but it may also be applicable in situations where the listener is subjected to different levels of nervous tension, such as while driving a car. The level of nervous tension can either be measured directly in the form of a heart rate measurement of the driver. It can also be measured indirectly by measuring the vehicle telematics information or by sensing the behaviour of the driver, such as how the often and fast the driver changes gear, etc. Another example where this is applicable is when working with a computer. In this case the external factor might be the speed or strength used when hitting the keys on the keyboard, the number of windows opened etc. In the video or computer game application the external tempo signal can be a measurement or estimation of the tempo of the video or computer game. Thus, when the tempo is high in the video or computer game high tempo music tracks will be selected and played. Alternatively, some other factor of the video or computer game can be measured such as the intensity of animation, the heart rate of the user etc. This enables the selection between a variety of music tracks without any manual operation, whilst the music tracks being played will still be suitable to the current stage of the video or computer game. Thus, when playing a game, different music tracks may be played during the same stage of the game at separate times the game is played.

In case the external tempo information input changes, the player can be set to react to the change either immediately or change after a while. Further it is possible that during the tempo input change, the player reacts in a way that two music files of the old tempo and new tempo are mixed.

For example the adaptation of which music track is selected for playback based on a tempo change of the external factor can take place during a game when the "gaming situation" changes.

In the case of other media files than MP3, such as MPEG2, WAV or any other existing or future media format, the addition of the metadata type tempo class will be readily apparent to the skilled person in view of the description above for MP3.

In another alternative the device 10 receives media data from an external source instead of retrieving locally stored media data from the storage medium 12.

Thus, the reading means 11 is further adapted to read a media data format from the RF portion 16, the media format being received in an radio signal via the antenna 15. The device 10 could for example be a mobile communication terminal adapted to store and receive digital media.

In still another alternative the device could be adapted to receive media data broadcasted via radio or a cable TV network, media data streamed over the Internet or other data network, or any other existing or future broadcasting or streaming technique. The receiving means are any suitable known receiving means depending on the application. The addition of the metadata type tempo class will be readily apparent to the skilled person in view of the description above for MP3.

Figure 2:
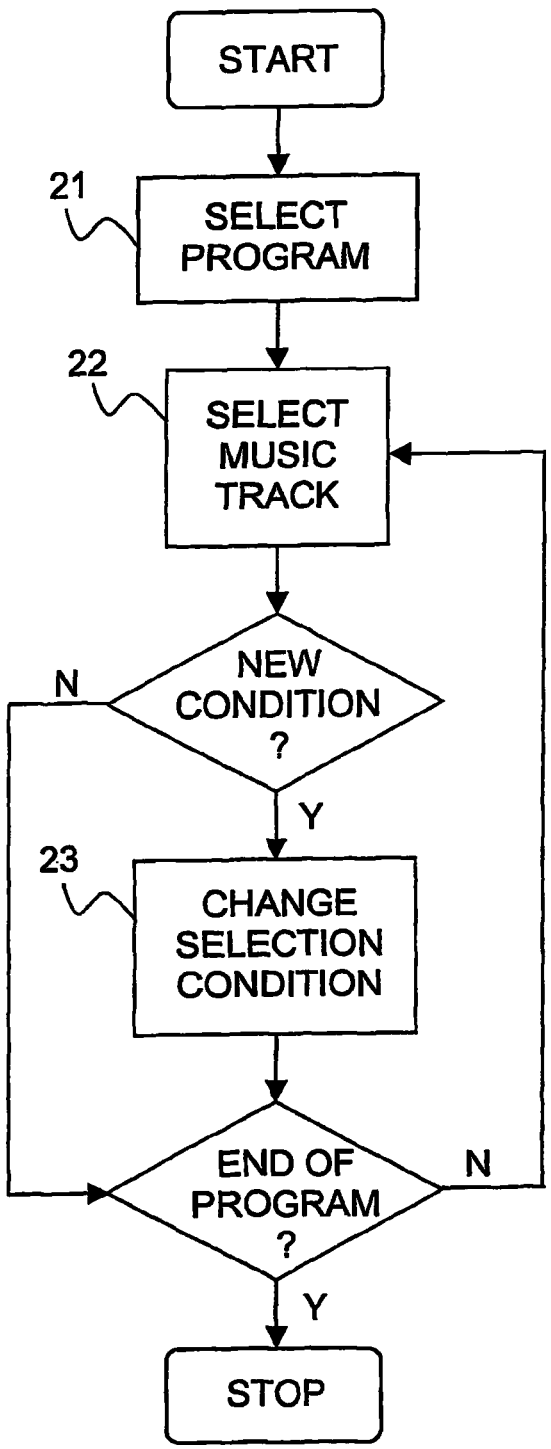
FIG. 2 is a flow chart of an embodiment of a method according to the invention.

In FIG. 2 a flow chart of an embodiment of a method according to the invention is shown. The embodiment is adapted for selecting MP3 files for playback in accordance with a predetermined program. The method is applicable for example in selecting MP3 files for playback during physical exercise, such a single training session or a series of training sessions.

According to the method a program is selected for the selection means of a device in step 21, such as the device 10 described in relation to FIG. 1. The program controls the selection means so that it during different time periods or for a number of consecutive times selects MP3 files having different tempo class values. In step 22 a music track is selected for playback based on the current selection condition of the program. For example, the selection condition could be that MP3 files having a tempo class value between 2-3. In step 23 it is determined if the selection condition has been altered by the program. This will typically be the case after a period of time or a number of consecutive music tracks. If the selection condition should not be altered and the program has not reached its end, a new music track will be selected in step 22 based on the same condition. If the selection condition should be altered and the program has not reached its end, the selection condition is changed in step 23. A new music track will be selected in step 22 based on the changed condition. The steps 22-23 are repeated until the program has reached its end.

Thus, the selected music tracks for playback can be adapted to suit and/or inspire different intensity levels of the exercise during different periods of time. Hence, by using such a method, the selected music will vary between training sessions using the same program without any need for manual control.

Figure 3:
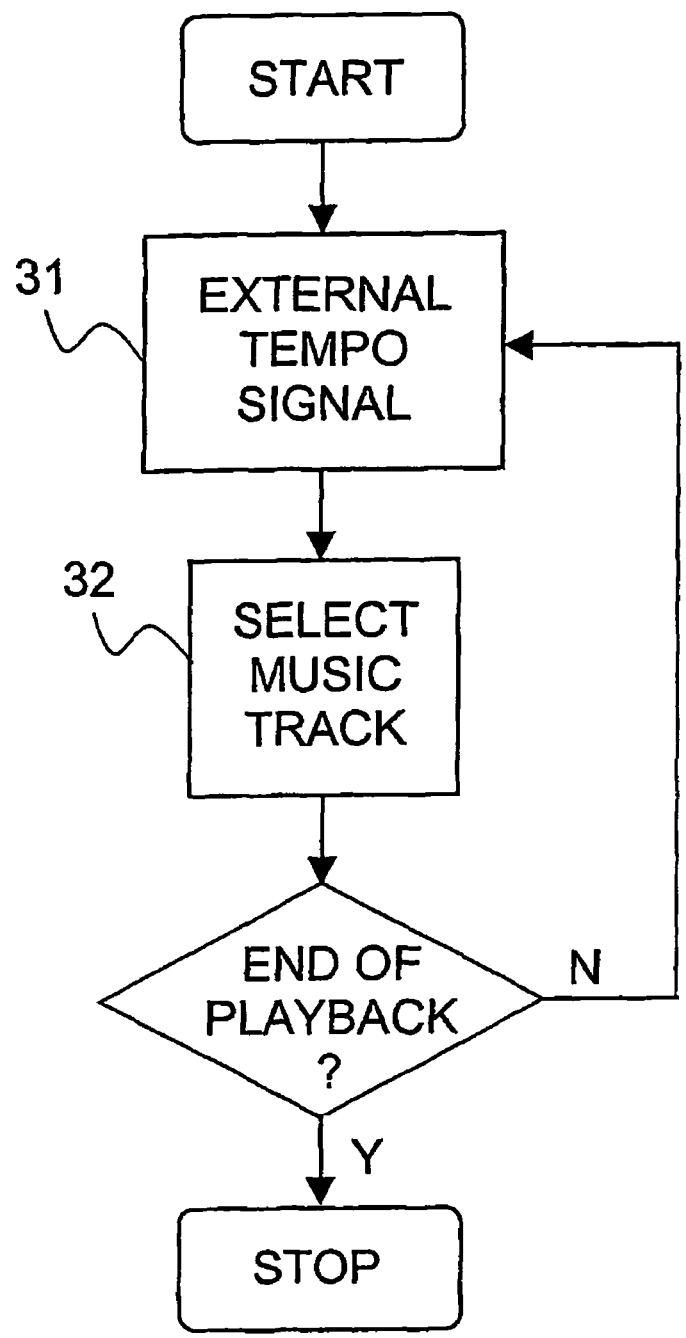
FIG. 3 is a flow chart of another embodiment of a method according to the invention.

In FIG. 3 another embodiment of a method according to the invention is shown. The embodiment is adapted for selecting MP3 files for playback in accordance with an external tempo signal. The method is applicable for example in selecting MP3 files for playback during physical exercise, or a video (or a computer) game.

According to the method an external tempo signal is received. The external tempo signal is a measurement or an estimation of the tempo of an external factor depending on the application, such as the heart rate in the case of physical exercise and the tempo of the visual presentation in the case of a video game. A current value of the tempo signal is used to control the selection means of a device, such as the device 10 described in relation to FIG. 1. For example, the selection means can be controlled to select MP3 files in step 31 having high tempo class values when the current value of the external tempo signal is high and vice versa. Alternatively, the selection means can be controlled to select MP3 files in step 31 having low tempo class values when the current value of the external tempo signal is low and vice versa. The steps 31-32 will be performed until the playback is ended. Hence, by using such a method, the selected music will vary without any need for manual control.

Figure 4:
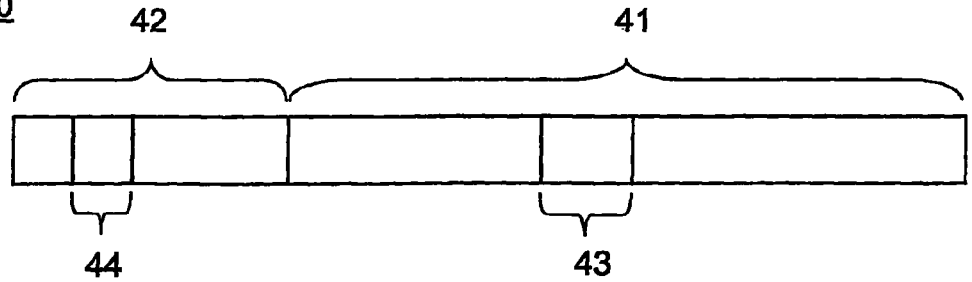
FIG. 4 is a schematic block diagram of an embodiment of a media data format according to the invention.

In FIG. 4 a schematic block diagram of an embodiment of a media data format. The media data format is the format of a MP3 file and comprises music data 41 and metadata 42. The music data comprises music data, such as the music data frame 43, and the metadata comprises metadata frames, such as the metadata frame 44. The metadata frames are defined by a modified version of the ID3v2 tagging system in MP3. Note that the relation between the metadata, music data, metadata frames and music data frames are for illustrational purposes only and does not indicate any preferred relation. The ID3v2 tagging system identifies several different metadata types associated with a music track comprised in an MP3 file. Examples of such metadata types are Title, Artist/Author, Album, Year, Genre, etc. Moreover, the modification of the data format of this embodiment is that each MP3 file also includes a metadata frame for the metadata type tempo class. This frame comprises a tempo class value having one of the integer values 1-10 indicating a tempo of said music track. The tempo class value 1 indicates a lowest tempo range, the tempo class values 2-9 each indicate a higher tempo range, and the tempo class value 10 indicates a highest tempo range.

It should be noted that the number tempo ranges is for illustrational purposes only. The tempo is measured in beats per minute.

In addition to the applications of the invention described above a multitude of applications of the invention are anticipated, such as mobile terminals capable to stream radio broadcasts, digital TV Broadcast, music at music clubs, music at the work place, existing and future broadcasting, leisure, pastime and gaming services, etc.

The invention claimed is:

1. A device comprising:
a reading element configured to read a media data format comprising a music data portion defining a music track, and a metadata portion defining metadata associated with said music track; wherein said reading element is configured to read a tempo class value of a tempo metadata type comprised in said metadata portion, said tempo class value indicating a tempo class of said music track; and
a selection element which is configured to select a music track associated with a tempo class value based at least partly on a current value of an external activity tempo signal containing information about a measurement or an estimation of a tempo of an external factor provided from a non-exercise related external device, the external factor comprising an indirect measurement or estimation of a current level of stress of a person, located in proximity to hear said selected music track, derived from sensing a behavior of an interaction of the person with a user input device of the external device; and
wherein said selection element is further configured to adapt the selection of music tracks based on a tempo change in the current value of the external activity tempo signal containing information about the measurement or the estimation of the tempo of the external factor, so as to select one or more music tracks associated with a first set of tempo class values during a first period of time and to select one or more music tracks associated with a second set of tempo class values during a second period of time.

2. The device as claimed in claim 1, wherein the non-exercise related external device is a vehicle and the user input device is a gear shifter.

3. The device as claimed in claim 2, wherein the sensing the behavior of the interaction of the person with the user input device comprises measuring how often or how fast the person changes gears in the vehicle.

4. The device as claimed in claim 1, wherein the non-exercise related external device is a computer and the user input device is a keyboard.

5. The device as claimed in claim 4, wherein the sensing the behavior of the interaction of the person with the user input device comprises measuring the speed or strength the person uses hitting keys on the keyboard.

6. The device as claimed in claim 4, wherein the sensing the behavior of the interaction of the person with the user input device comprises measuring the number of windows opened on the computer.

7. The device as claimed in claim 1, wherein one music track selected of the first set of tempo class values and one music track selected of the second set of tempo class values are mixed during the transition from the first period of time to the second period of time.

8. The device as claimed in claim 1, wherein said tempo class value is one of a set of tempo class values, and each tempo class value defines a playback tempo range.

9. The device as claimed in claim 1, further comprising:
a writing element configured to write to said media data format a tempo class value associated with said music track.

10. The device as claimed in claim 1, wherein if the current value of the external activity tempo signal deviates from a predetermined range, then the selection element is configured to react to the deviation either immediately or after a period of time in order to influence the external activity tempo signal.

11. A method comprising:
selecting and playing music tracks, each associated with a media data format comprising a music data portion defining the music track, and a metadata portion defining metadata associated with said music track,
reading a tempo class value of a tempo metadata type comprised in said metadata portion, said tempo class value indicating a tempo class of said music track,
receiving a current value of an external activity tempo signal containing information about a measurement or an estimation of a tempo of an external factor provided from a non-exercise related external device, the external factor comprising an indirect measurement or estimation of a current level of stress of a person, located in proximity to hear said selected music track, derived from sensing a behavior of an interaction of the person with a user input device of the external device;
selecting a music track associated with a tempo class value based at least partly on said current value of the external activity tempo signal;
playing said selected music track; and
adapting the selection of music tracks if a tempo change is determined in the current value of the external activity tempo signal containing information about the measurement or estimation of the tempo of the external factor, so as to select a second music track associated with a second tempo class value based at least partly on said change in the current value of the external activity tempo signal.

12. The method as claimed in claim 11, wherein the selecting of the music track further comprises:
selecting one or more music tracks associated with a first set of tempo class values during a first period of time; and
selecting one or more music tracks associated with a second set of tempo class values during a second period of time.

13. The method as claimed in claim 12, wherein said first set of tempo class values is different from said second set of tempo values.

14. The method as claimed in claim 11, wherein said tempo class value is one of a set of tempo metadata type values, and each tempo class value defines a playback tempo range.

15. The method as claimed in claim 11, further comprising:
writing to said media data format a tempo class value associated with said music track.

16. A method as claimed in claim 11, wherein the selecting comprises reacting to changes in the current value of the external activity tempo signal either immediately or after a period of time in order to influence the external activity tempo signal.

17. The method as claimed in claim 11, wherein the non-exercise related external device is a vehicle and the user input device is a gear shifter.

18. The method as claimed in claim 12, wherein the sensing the behavior of the interaction of the person with the user input device comprises measuring how often or how fast the person changes gears in the vehicle.

19. The method as claimed in claim 11, wherein the non-exercise related external device is a computer and the user input device is a keyboard.

20. The method as claimed in claim 19, wherein the sensing the behavior of the interaction of the person with the user input device comprises measuring the speed or strength the person uses hitting keys on the keyboard.

21. The method as claimed in claim 19, wherein the sensing the behavior of the interaction of the person with the user input device comprises measuring the number of windows opened on the computer.

22. The method as claimed in claim 12, wherein one music track selected of the first set of tempo class values and one music track selected of the second set of tempo class values are mixed during the transition from the first period of time to the second period of time.

23. A computer readable medium comprising computer executable instructions for performing the steps of claim 11.

\* \* \* \* \*